United States Patent [19]

Yanagi

[11] Patent Number: 5,202,865

[45] Date of Patent: Apr. 13, 1993

[54] TRACK ACCESS CONTROL APPARATUS FOR OPTICAL DISK APPARATUS

[75] Inventor: Shigenori Yanagi, Kawasaki, Japan

[73] Assignee: Fujitsu Limited, Kawasaki, Japan

[21] Appl. No.: 488,250

[22] Filed: Mar. 5, 1990

[30] Foreign Application Priority Data

Mar. 9, 1989 [JP] Japan .................................. 1-56947
Mar. 20, 1989 [JP] Japan .................................. 1-68682

[51] Int. Cl.⁵ .......................................... G11B 7/085
[52] U.S. Cl. .................................. 369/32; 369/44.370; 369/111; 369/44.280
[58] Field of Search ............... 369/32, 47, 48, 49, 369/58, 112, 116, 44.11, 44.12, 44.32, 44.25, 44.41, 44.42, 109, 44.37, 44.38, 44.28, 50, 111, 43

[56] References Cited

U.S. PATENT DOCUMENTS

| | | | |
|---|---|---|---|
| 4,074,085 | 2/1978 | Russell . | |
| 4,577,301 | 3/1986 | Matthews et al. | 369/111 |
| 4,752,922 | 6/1988 | MacAnally et al. | 369/32 |
| 4,841,514 | 6/1989 | Tsuboi et al. | 369/44.37 |
| 5,031,165 | 7/1991 | Fujita | 369/44.28 |

FOREIGN PATENT DOCUMENTS

0303369A2 7/1988 European Pat. Off. .

Primary Examiner—Wayne R. Young
Assistant Examiner—Muhammad Edun
Attorney, Agent, or Firm—Staas & Halsey

[57] ABSTRACT

A track access control method and apparatus for an optical disk apparatus are disclosed. Where a locus of movement of an object lens through which a write beam and a read beam are projected onto an optical disk upon track accessing is offset from a straight line which passes the center of the optical disk, the positional relationship of the read beam and the write beam is controlled relatively in accordance with a track position so that, at any track position, the read beam and the write beam can be positioned on the same track.

7 Claims, 16 Drawing Sheets

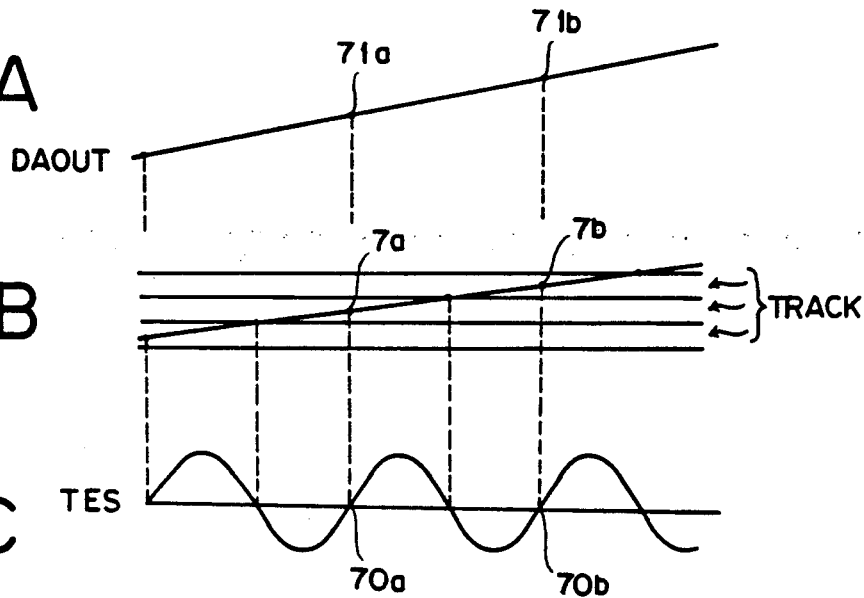
FIG. 15A DAOUT
FIG. 15B TRACK
FIG. 15C TES
FIG. 16A
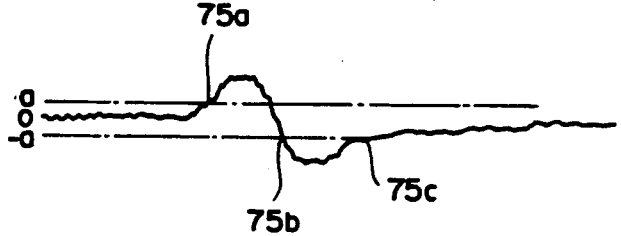
FIG. 16B

TRACK ACCESS CONTROL APPARATUS FOR OPTICAL DISK APPARATUS

BACKGROUND OF THE INVENTION

This invention relates to a track access control method and apparatus for an optical disk apparatus, and more particularly to a track access control method and apparatus for an optical disk apparatus wherein two beams including a write beam and a read beam pass through a single object lens of an optical head such that, while data are being written onto a certain track of an optical disk with the write beam, the information written with the write beam is read out with the read beam which is positioned rearwardly of the write beam in the direction of rotation of the disk.

Verify read is carried out with conventional optical disk apparatus. Such verify read involves reading, after data have been written onto an optical disk, of such data to compare the read out data with the write data to assure the reliability of the optical disk apparatus.

In conventional systems, a single beam of light is projected onto an optical disk by way of an object lens of an optical head so that it may serve for both of writing and reading. More particularly, using a single beam of light, writing is carried out for a certain one rotation of an optical disk, and then, reading is carried out for a next one rotation of the optical disk, whereafter the write data and the read data are compared with each other. With an optical disk apparatus which carries out such verify read, an optical disk must be rotated by two complete rotations for the writing of data, and there is a problem that much time is required.

In recent years, a technique has been proposed wherein a write beam and a read beam pass through a single object lens of an object head at the same time such that, while data are being written onto a certain track of an optical disk with the write beam, the information written with the write beam is read out by the read beam which is positioned rearwardly of the write beam in the direction of rotation of the disk. Consequently, writing of data and verify read are carried out at the same time thereby to reduce the data writing time of the optical disk apparatus. In the optical disk apparatus, focusing of a beam of light is controlled by a focusing servo controller while the track position of the beam is controlled by a track servo controller simultaneously for both of the write beam and the read beam. Track servo control makes use, for example, of a variation of the amount of reflected light due to a diffraction phenomenon of a beam spot by a spiral guide groove (track) provided in advance on an optical disk. In particular, making use of the fact that a reflected light amount distribution detected by a photodetector is varied with a diffraction of light by a track depending upon a position of a beam spot relative to the track, a track error signal of a beam spot with respect to the track is obtained.

Such track error signal is obtained by receiving an amount of reflected light of a write beam by means of a photodetector. Conventionally, in an optical disk apparatus wherein two beams of light are projected onto an optical disk through a single object lens to carry out writing and reading of data at the same time, a track error signal is obtained only from the write beam to control the track positions of the two beams at the same time.

In such optical disk apparatus, when a certain track of an optical disk is to be accessed, an RF signal is produced by a photodetector which receives a write beam of light, and an address of one of tracks preformatted upon production of the optical disk at which a write beam is positioned at present is read from the RF signal. Subsequently, a difference is detected between the thus read track address and a target track address designated from a supervisory controller so as to be accessed, and while reading an RF signal from a write beam, an optical head is moved by an optical head drive motor. Then, when the target track address is reached, the optical head drive motor is controlled to stop the optical head.

In an optical disk apparatus of the type wherein an object lens mounted on an optical head moves, upon accessing thereof, on a straight line which passes the center of an optical disk, when the optical head moves so that a write beam therefrom accesses a certain track, a read beam moves to simultaneously access the same track.

In recent years, a novel optical disk apparatus has been proposed wherein an optical head has, in addition to an object lens for projecting a write beam and a read beam onto an optical disk, another object lens mounted therein for projecting an erase beam onto the optical disk. In such optical disk apparatus, it is impossible to move both object lenses, upon accessing by the optical head, on a straight line which passes the center of the optical disk. Accordingly, such optical disk apparatus must necessarily have such a construction that the object lenses move on a straight line which is offset from the center of the optical disk. It has been apparent that, in an optical disk apparatus of the type just mentioned, since the relationship between a track position of a write beam and another track position of a read beam is different on the inner side and the outer side of an optical disk, it is necessary to correct the track position of the read beam in accordance with the access position of the optical disk.

SUMMARY OF THE INVENTION

Accordingly, it is an object of the present invention to provide a track access control method and apparatus for an optical disk apparatus wherein two beams of light including a main beam and an auxiliary beam which are to be projected onto an optical disk through a single object lens can be positioned accurately on a target track when accessing thereof.

It is another object of the present invention to provide a track access control method and apparatus for an optical disk apparatus wherein access control upon track accessing of an auxiliary beam which is to be projected onto an optical disk together with a main beam through a single object lens can be made even if the sensitivity of a sensor is varied due to a temperature variation or the like.

In accordance with an aspect of the present invention, there is provided a track access control apparatus for an optical disk apparatus including a rotatable optical disk on which a plurality of guide grooves for defining tracks and guiding a beam spot projected thereon are spirally formed along a direction of rotation of the rotatable optical disk, and an optical head including a first light source for emitting a first beam of light, a second light source for emitting a second beam of light and an object lens for focusing the first and the second beams onto the optical disk, said track access control apparatus comprising: first photodetector means for detecting light of the first beam reflected from said optical disk and producing a first output signal; optical head access control means for moving said optical head to a target position where the first beam is positioned on a track having a target track address, said optical head access control means including means for obtaining a current track address from the first output signal, means for detecting a difference between the target track address and the current track address and means for moving said object lens to the target position across the tracks of said optical disk along a line which is offset from a line passing through the center of said optical disk and parallel thereto; means for obtaining relative positional information between the first and the second beams on said optical disk at said target track address; means for moving the position of the second beam on said optical disk; and means for computing a driving amount of said second beam moving means required to move the second beam to a target track based on said relative positional information.

With the track access control apparatus of the present invention, relative positional information of the second beam to the first beam is obtained from the track address to be accessed by the first beam, and in accordance with the relative positional information, the second beam is positioned on the track address which is accessed by the first beam. Accordingly, in the optical disk apparatus wherein the object lens provided on the optical head moves, upon accessing, on the line offset from the center of the optical disk, the first beam and the second beam can be positioned to access the same track.

In accordance with another aspect of the present invention, there is provided a track access control method for an optical disk apparatus including a rotatable optical disk on which a plurality of guide grooves for defining tracks and guiding a beam spot projected thereon are spirally formed along a direction of rotation of the rotatable optical disk, and an object lens for focusing light beams onto the optical disk, comprising the steps of: projecting first and second beams onto said optical disk simultaneously through said object lens; obtaining a first signal by detecting light of the first beam reflected from said optical disk; obtaining a current track address of the first beam on said optical disk from said first signal; detecting a difference between the current track address and a target track address to which the first beam is to be moved; moving said object lens across the tracks of said optical disk along a line which is offset from a line passing through the center of said optical disk so that the first beam is positioned on a target track; obtaining relative positional information between the first and the second beams on said optical disk at said target track address; computing a driving amount for moving the second beam to said target track based on said relative positional information; and moving the position of the second beam on said optical disk based on said driving amount to thereby position the second beam on said target track.

The above and other objects, features and advantages of the present invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIGS. 15A to 15C are diagrams illustrating a variation of a track position of a second beam and a variation of a track error signal when an output of a digital to analog converter varies, and wherein FIG. 15A shows an output of the digital to analog converter, FIG. 15B shows a variation of a track position of a second beam, and FIG. 15C shows a variation of a track error signal;

FIG. 16A is a diagram showing an output value of the digital to analog converter upon test seeking;

FIG. 16B is a diagram showing a variation of a track error signal upon test seeking.

DESCRIPTION OF THE PREFERRED EMBODIMENTS

Before preferred embodiments of the present invention are described, the conventional apparatus described hereinabove will be described in more detail with reference to the drawings because it is considered desirable to describe construction and disadvantages of the conventional apparatus in order to facilitate understanding of the present invention.

Figure 1:
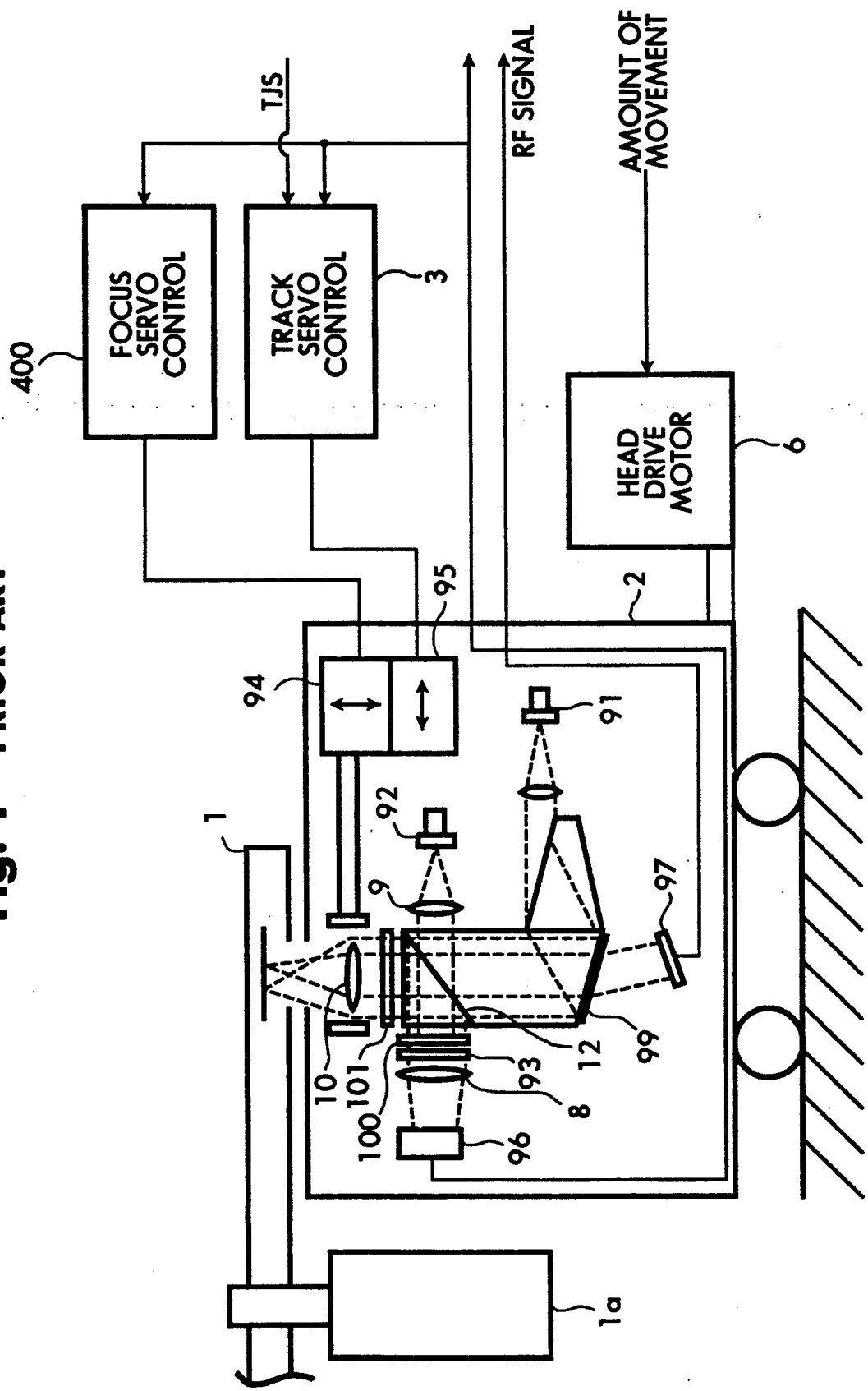
FIG. 1 is a schematic view showing construction of a conventional optical head wherein two beams of light pass through a single object lens and a control system for the optical head.
Figure 2:
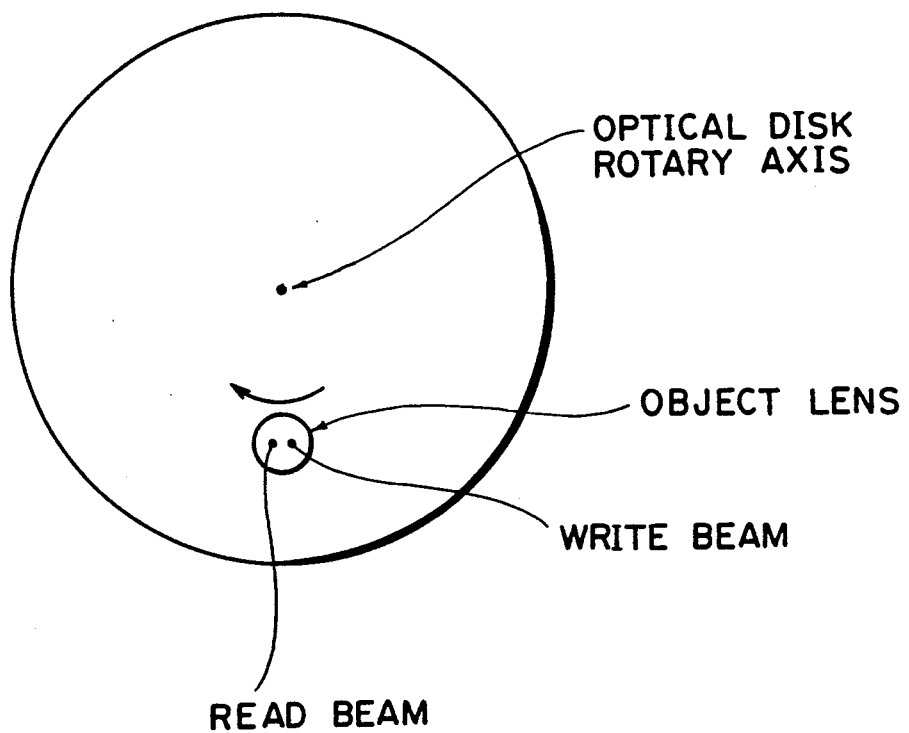
FIG. 2 is a schematic view showing a positional relationship between a write beam and a read beam on a rotatable optical disk.

Referring at first to FIG. 1, there is shown construction of an optical head section of such a conventional optical disk apparatus as described above. The optical head section shown includes a motor 1a for rotating an optical disk 1 around an axis of a rotary shaft thereof, and an optical head 2 which is moved and positioned in a radial direction of the optical disk 1 with respect to the optical disk 1 by a head drive motor 6. The optical head 2 has an object lens 10 through which two beams of light pass to carry out reading (reproduction) from and writing (recording) onto the optical disk 1 with the individual beams. The two beams are introduced simultaneously from the single object lens 10 to the optical disk 1 and having such a positional relationship as shown in FIG. 2 wherein the write beam is positioned on the upstream side of the read beam in the direction of rotation of the optical disk 1 on the same track.

Referring back to FIG. 1, the write beam is emitted from a semiconductor laser 91 which serves as a light source. The thus emitted beam of light is reflected by a dichroic mirror 99 and passes through a polarizing beam splitter 12. Then the beam is changed into circularly polarized light by a quarter-wave plate 101 and then introduced into the object lens 10 so that it is focused into a beam spot and projected upon the optical disk 1. Reflected light from the optical disk 1 passes first through the object lens 10 and then through the quarter-wave plate 101 again whereupon its polarization plane is rotated by 90 degrees with respect to the polarization plane of the original beam. Consequently, the reflected light of the write beam from the optical disk 1 is reflected by the polarizing beam splitter 12 and then passes through a lens 8 whereafter it is introduced to a four-division photodetector 96.

The read beam is emitted from another semiconductor laser 92 and has a different wavelength from that of the write beam. The read beam is then collimated by a collimate lens 9 and then passes through the polarizing beam splitter 12 and further through another quarter-wave plate 100 whereupon it is changed into circularly polarized light, whereafter it is reflected by another dichroic mirror 93. Then, the read beam passes again through the quarter-wave plate 100 whereon the polarization plane thereof is rotated by 90 degrees from the polarization plane of the original beam. Consequently, the read beam is reflected by the polarizing beam splitter 12 and then projected onto the optical disk 1 through the quarter-wave plate 101 and object lens 10. Reflected light of the read beam from the optical disk 1 passes again through the quarter-wave plate 101 whereon the polarization plane thereof is rotated so that it may coincide with the polarization plane of the original beam. Consequently, the reflected light of the read beam thereafter passes through the polarizing beam splitter 12 and then through the dichroic mirror 99 and is introduced to another photodetector 97.

In the meantime, in such optical disk apparatus, a large number of tracks are formed on the optical disk 1 in a spaced relationship by several microns in a radial direction of the optical disk 1, and displacement of a track is increased even by a little eccentricity of the optical disk 1. Further, while displacement of a beam spot on the optical disk is caused by inadvertent movement of the optical disk 1, a beam spot having a size smaller than 1 micron must follow the displacement of the track. To this end, the optical head section further includes a focus actuator or focus coil 94 for moving the object lens 10 of the optical head 2 in upward and downward directions in FIG. 1 to change the focus position, and a track actuator or track coil 95 for moving the object lens 10 in leftward and rightward directions in FIG. 1. The optical head section further includes a focus servo control 400 for producing a focus error signal FES from a received light signal of the photodetector 96 to drive the focus actuator 94, and a track servo control 3 for producing a track error signal TES from a received light signal of the photodetector 96 to drive the track actuator 95.

The track servo control 3 makes use, for example, of a change of an amount of reflected light caused due to a diffraction phenomenon of a beam spot by one of a plurality of spiral guide grooves (tracks) provided in advance on the optical disk 1. In particular, making use of the fact that a reflected light amount distribution detected by the photodetector 96 is varied by a diffraction of light by a track depending upon a position of a beam spot relative to the track, a track error signal (position error signal) of a beam spot with respect to the track is obtained. Such track error signal is obtained by detecting a reflected light amount of a write beam by means of the photodetector 96. In the conventional optical disk apparatus wherein two beams of light are simultaneously projected onto the optical disk 1 through the single object lens to carry out writing and verify read of data at the same time, a track error signal is obtained only from the write beam to simultaneously control the track positions of the two beams including the write beam and the read beam.

Thus, when a certain track of the optical disk 1 is to be accessed, conventionally an RF signal is produced from the four-division photodetector 96 which receives a write beam, and then an address of one of tracks preformatted in advance upon production of the optical disk at which address the write beam is positioned at present is read from the RF signal. A track address controlling section not shown detects a difference between the thus read track address and a target track address which is designated so as to be accessed from a supervisory controller, and while reading the RF signal from the write beam, the optical head 2 is controlled so that it may be moved by the head drive motor 6 until the target track address is reached.

In an optical disk apparatus of the type wherein an object lens moves, upon track accessing, on a straight line which passes the center of an optical disk, if track access control is executed in such a manner as described above, then a read beam is controlled to access the same track as a write beam. However, in another optical disk apparatus which has been proposed in recent years and wherein an optical head has, in addition to an object lens for passing a write beam and a read beam therethrough to project onto an optical disk, another object lens mounted therein for projecting an erase beam onto the optical disk, it is impossible to move both object lenses, upon track accessing, on a straight line which passes the center of the optical disk. In such optical disk apparatus, since the relationship between a track position of a write beam and another track position of a read beam is different on the inner side and the outer side of an optical disk, it is necessary to correct the position either of the read beam or of the write beam by some suitable means.

Figure 3:
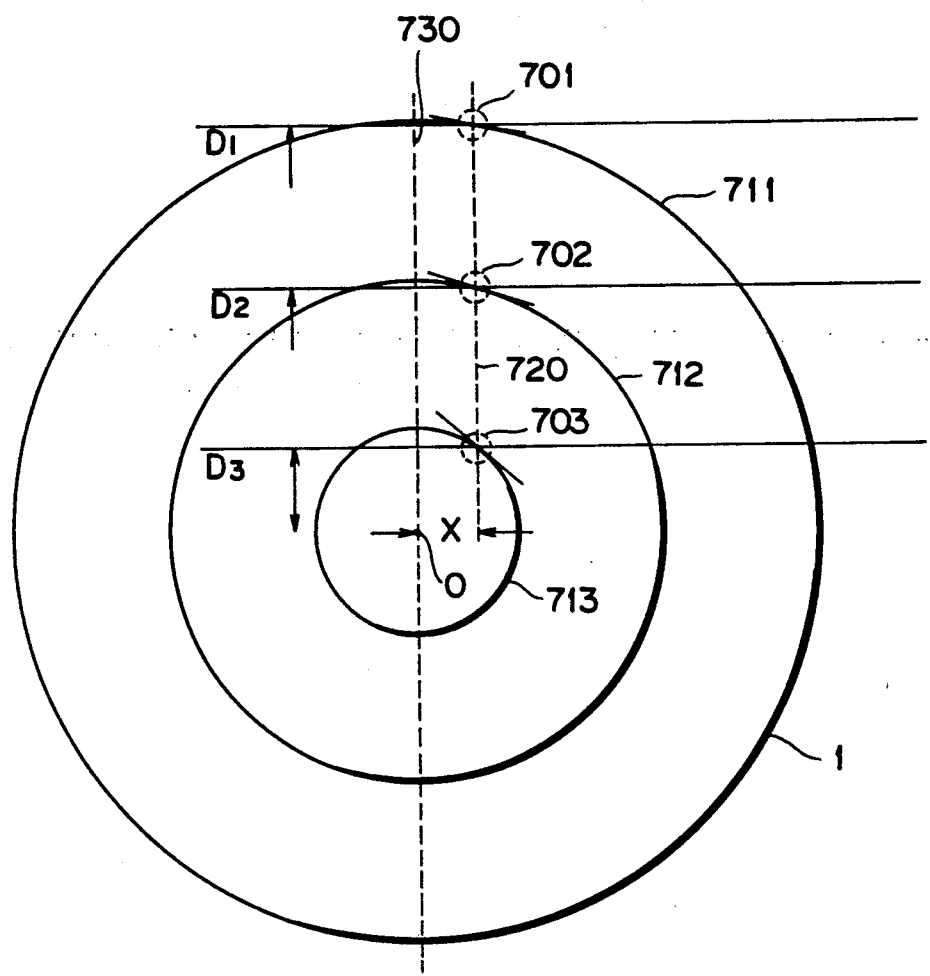
FIG. 3 is a diagrammatic representation showing a variation of the positional relationship between a write beam and a read beam on the outer side and the inner side of an optical disk.
Figures 4A, 4B, 4C:
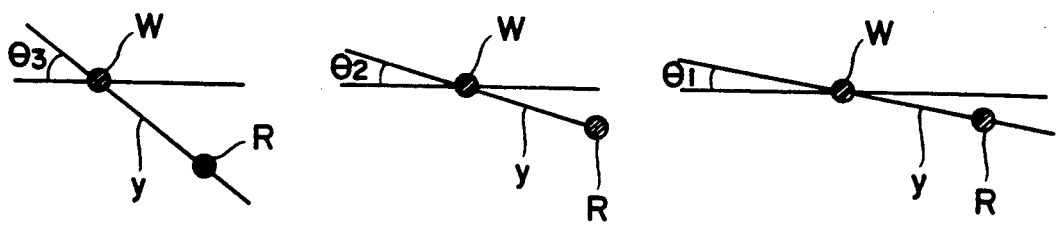
FIGS. 4A to 4C are enlarged views of portions of intersecting points 701, 702 and 703 of FIG. 3 illustrating an ideal positional relationship between a write beam and a read beam at each of such intersecting points.

Referring to FIG. 3, concentrical circles 711, 712 and 713 are shown which have the centers at the center 0 of an optical disk 1. It is assumed here that the object lens 10 of the optical head 2 moves on a broken line 720. A track accessing movement is carried out by moving the optical head 2 by means of the head drive motor 6 so that the object lens 10 may move on the broken line 720. A write beam and a read beam must be positioned on a tangential line to any of the circles 711, 712 and 713 at one of intersecting points 701, 702 and 703 of the concentrical circles 711, 712 and 713 with the broken line 702. FIGS. 4A to 4C illustrate ideal positional relationships between a write beam W and a read beam R at the intersecting points 701, 702 and 703 of FIG. 3, respectively. In particular, where the distance between the read beam and the write beam is presented by y and the angles defined by straight lines perpendicular to the broken line 720 at the intersecting points 701, 702 and 703 and tangential lines to the circles 711, 712 and 713 at the intersecting points 701, 702 and 703 are represented by $\theta_1$, $\theta_2$ and $\theta_3$, respectively, the write beam and the read beam cannot be positioned on the same track unless they are positioned in a spaced relationship by a distance $y\tan\theta_1$, $y\tan\theta_2$ or $y\tan\theta_3$ in the direction perpendicular to the tracks. According to a conventional track access control method, since only the track position of a write beam is controlled upon track accessing, a read beam cannot be controlled to access the same track with the write beam in such an instance as described above.

Figure 5:
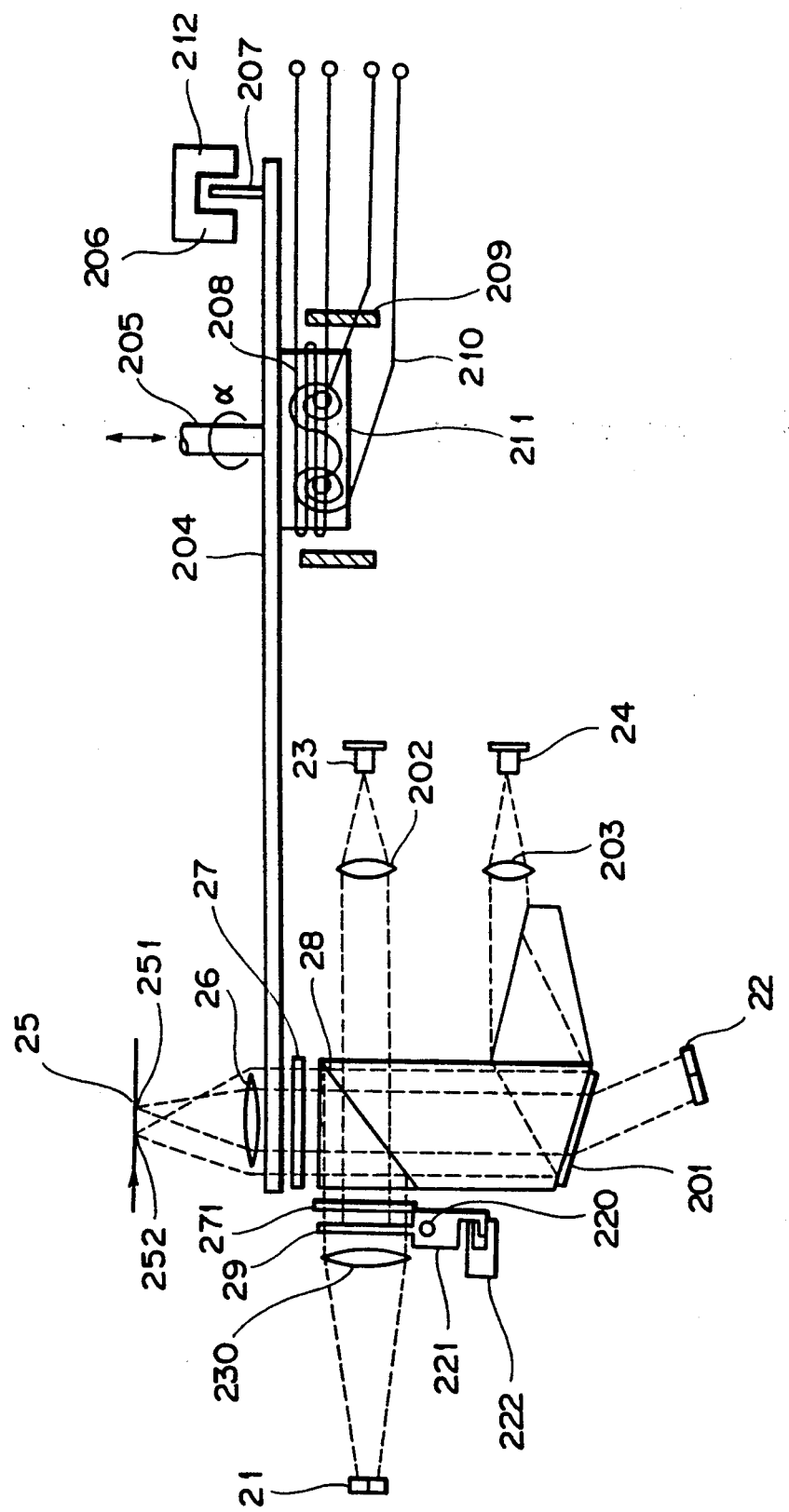
FIG. 5 is a schematic view showing construction of an optical head and an object lens actuator of an embodiment of the present invention.

The present invention has been made to solve such problems of the conventional apparatus as described above and will be described in detail below in connection with preferred embodiments thereof. Referring to FIG. 5, a semiconductor laser 24 emits a write beam of light of a wavelength of 830 nm. The beam of light emitted from the semiconductor laser 24 is changed into a collimate beam by a collimator lens 203 and then reflected by a dichroic mirror 201. The dichroic mirror 201 is constituted such that it passes light of a wavelength of 780 nm therethrough but reflects light of another wavelength of 830 nm. The write beam reflected by the dichroic mirror 201 then passes through a polarizing beam splitter 28 and then through a quarter-wave plate 27 whereupon it is changed into circularly polarized light, whereafter it is focused into a beam spot 252 on an optical disk 25 by an object lens 26. Reflected light from the optical disk 25 passes through the object lens 26 and then through the quarter-wave plate 27 again whereupon the polarization plane thereof is rotated by 90 degrees from the polarization plane of the original write beam. Consequently, the reflected light is reflected by the polarizing beam splitter 28, and then it is changed into circularly polarized light by another quarter-wave plate 271 and then introduced into a galvano mirror 29. Since the galvano mirror 29 is constituted such that it passes light of a wavelength of 830 nm therethrough but reflects light of another wavelength of 730 nm, the reflected light passes through the galvano mirror 29, whereafter it is focused on a four-division photodetector 21 by a lens 230.

On the other hand, another semiconductor laser 23 emits a beam of light of a wavelength of 780 nm for use as a read beam. The beam of light emitted from the semiconductor laser 23 is changed into a parallel beam by a collimator lens 202 and then passes through the polarizing beam splitter 28, whereafter it is changed into circularly polarized light by the quarter-wave plate 271. The circularly polarized beam of light is then reflected by the galvano mirror 29 and then passes again through the quarter-wave plate 271 whereupon the polarization plane thereof is rotated by 90 degrees from the polarization plane of the original read beam. Consequently, the beam is reflected by the polarizing beam splitter 28, and after then, it is changed into circularly polarized light by the quarter-wave plate 27 and focused into a beam spot 251 on the optical disk 25 by the object lens 26. Then, when the reflected light from the optical disk 25 passes again through the quarter-wave plate 27, the polarization plane thereof is rotated so that it may coincide with the polarization plane of the original read beam. Consequently, the reflected light of the read beam thereafter passes through the polarizing beam splitter 28 and then through the dichroic mirror 201 whereafter it is introduced to a two-division photodetector 22.

In the meantime, the object lens 26 is provided at an end of an object lens actuator body or track actuator body 204 which is mounted for rotation around a rotary shaft 205. The actuator body 204 has a fixed slit plate 207 formed at the other end thereof. A bobbin 211 is fixedly mounted on the actuator body 204, and a focus actuator or focus coil 208 is provided around the bobbin 211 while a spiral track actuator or track coil 210 is provided on a side face of the bobbin 211. A magnet 209 is provided around the bobbin 211.

Accordingly, when the focus coil 208 is energized, the object lens actuator body 204 on which the object lens 26 is carried is moved in a direction of the X-axis or in an upward or downward direction in FIG. 5 in a similar manner to a voice coil motor, thereby changing the position of the object lens 26 in a focus direction. On the other hand, when the track coil 210 is energized, the object lens actuator body 204 is rotated in an $\alpha$ direction around the rotary shaft 205, thereby changing the position of the object lens 26 in a direction across tracks.

Figure 6A:
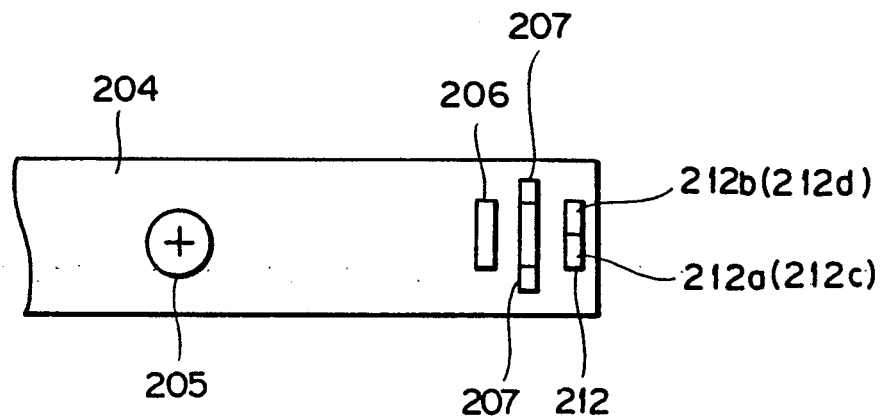
FIG. 6A is a schematic view showing an arrangement of a position sensor of the object lens actuator.

A light emitter 206 and a photodetector 212 which constitute a position sensor are provided in such a manner on the opposite sides of the fixed slit plate 207 provided at the end of the actuator body 204 as shown in FIG. 6A. The photodetector 212 is constituted from a four-division photodetector which is divided into four portions 212a to 212d. A window W is formed at the fixed slit plate 207 as shown in FIG. 6B so that light from the light emitter 206 may be received by the four-division photodetectors 212a to 212d by way of the window W.

Figure 6B:
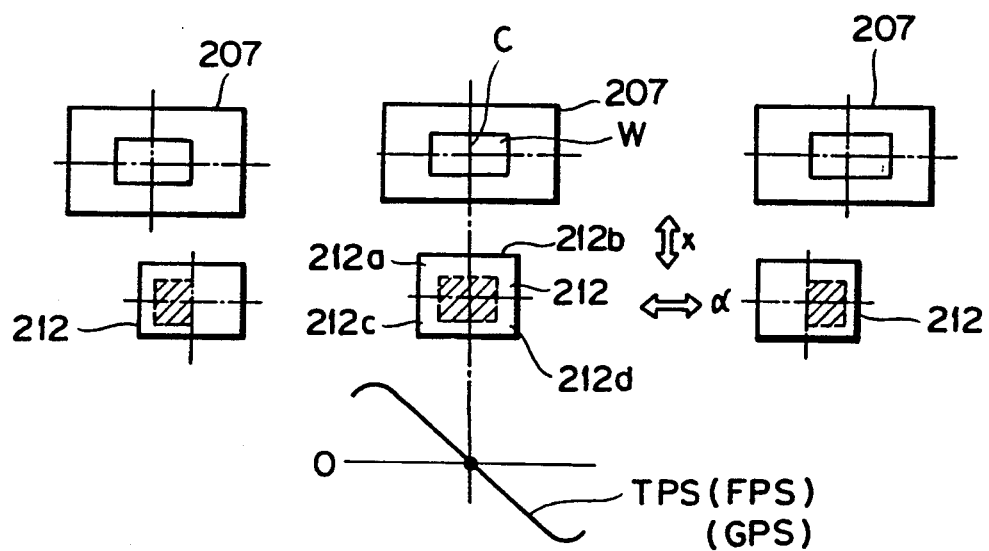
FIG. 6B is an illustrative view showing a manner wherein a received light distribution of the position sensor varies in accordance with amounts of movement of the object lens actuator in an $\alpha$ direction and an X direction.

Consequently, the received light distributions of the four-division photodetectors 212a to 212d vary in accordance with amounts of movement of the actuator body 204 in the $\alpha$ direction and the X direction as shown in FIG. 6B. Accordingly, a position signal TPS for the track direction and another position signal FPS for the focus direction are obtained from outputs A, B, C and D of the four-division photodetectors 212a to 212d in the following manner.

$$TPS = (A+C) - (B+D)$$

$$FPS = (A+B) - (C+D)$$

Such position signals TPS and FPS present a substantially S-shaped variation with respect to a displacement from the center position at which they present a value equal to 0 as shown in FIG. 6B. An electric spring force acting toward the center position can thus be provided using such position signals TPS and FPS.

Figure 7A:
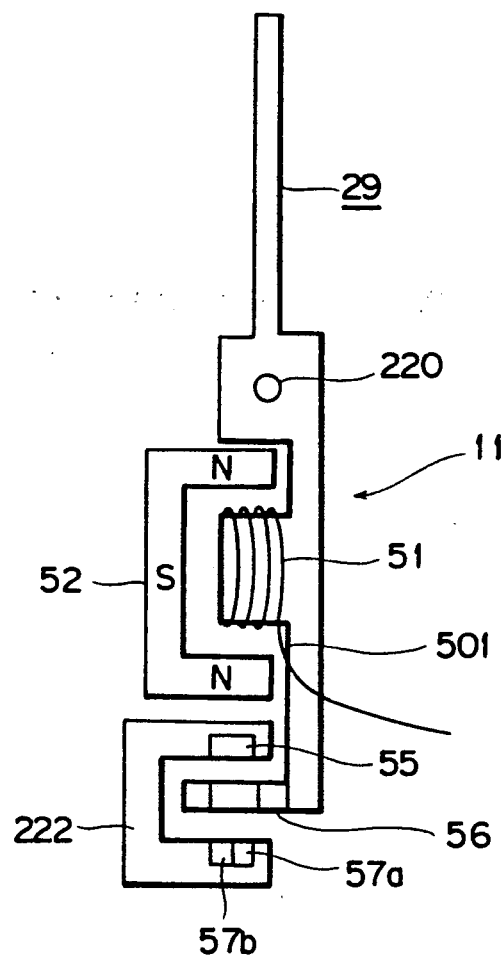
FIG. 7A is a schematic side elevational view showing details of a galvano mirror assembly.
Figure 7B:
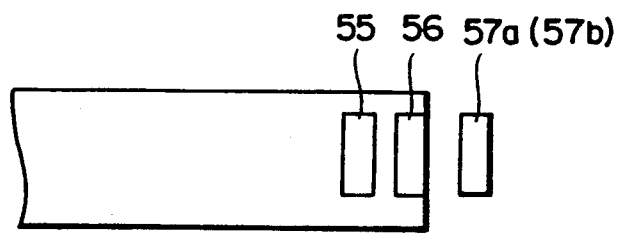
FIG. 7B is a schematic view showing an arrangement of a position sensor of the galvano mirror assembly.

As best shown in FIG. 7A, a galvano mirror assembly 11 is constituted from the galvano mirror 29 mounted for pivotal motion around a shaft 220, a galvano mirror position sensor 222, and a magnet 52. A bobbin 51 is provided in an integrated relationship on the galvano mirror 29, and a read beam track coil or galvano mirror actuator 501 is wound around the bobbin 51. When the coil 501 is energized, the galvano mirror 29 is pivoted around the shaft 220. The galvano mirror position sensor 222 is constituted from a light emitter 55, a slit plate 56 and a two-division photodetector 57. The fixed slit plate 56 is provided in an integrated relationship at the opposite end portion of the galvano mirror 29 with respect to the shaft 220. As shown in FIG. 7B, the light emitter 55 and the two-division photodetectors 57a and 57b are disposed in an opposing relationship through the fixed slit plate 56.

Figure 7C:
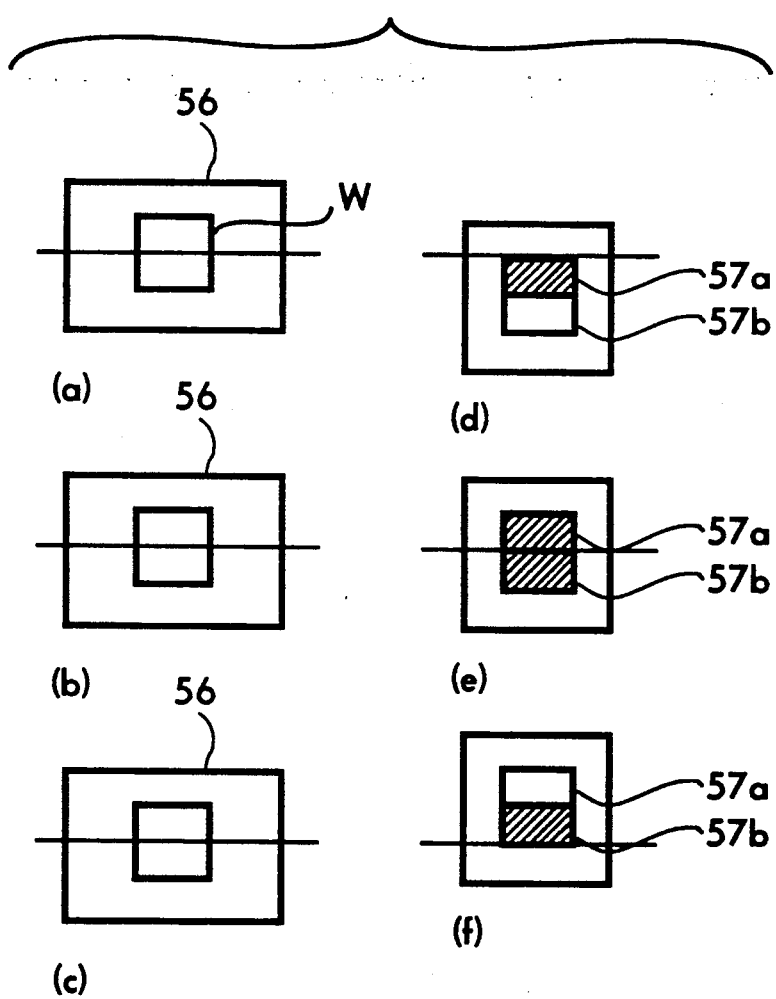
FIG. 7C is a schematic illustration showing a change of a received light distribution of the galvano mirror position sensor when the galvano mirror is rocked.

As shown in FIG. 7C, a window W is provided in the fixed slit plate 56 so that light from the light emitter 55 may be received by the two-division photodetectors 57a and 57b by way of the window W. Consequently, the received light distribution of the two-division photodetectors 57a and 57b vary in accordance with an amount of pivotal motion of the galvano mirror 29 around the shaft 220 as shown in FIG. 7C. Accordingly, a galvano mirror position signal GPS in the direction across the tracks can be obtained from outputs A and B of the two-division photodetectors 57a and 57b in the following manner.

$$GPS = A - B$$

Such galvano mirror position signal GPS presents a substantially S-shaped variation with respect to a displacement from the center position at which it presents a value equal to 0 similarly to the position signals TPS and FPS shown in FIG. 6B, and an electric spring force acting toward the center position can thus be provided using the galvano mirror position signal GPS.

Subsequently, referring to FIGS. 8 and 9, construction of the track servo control and a track access control of the embodiment of the present invention will be described.

Figure 8:
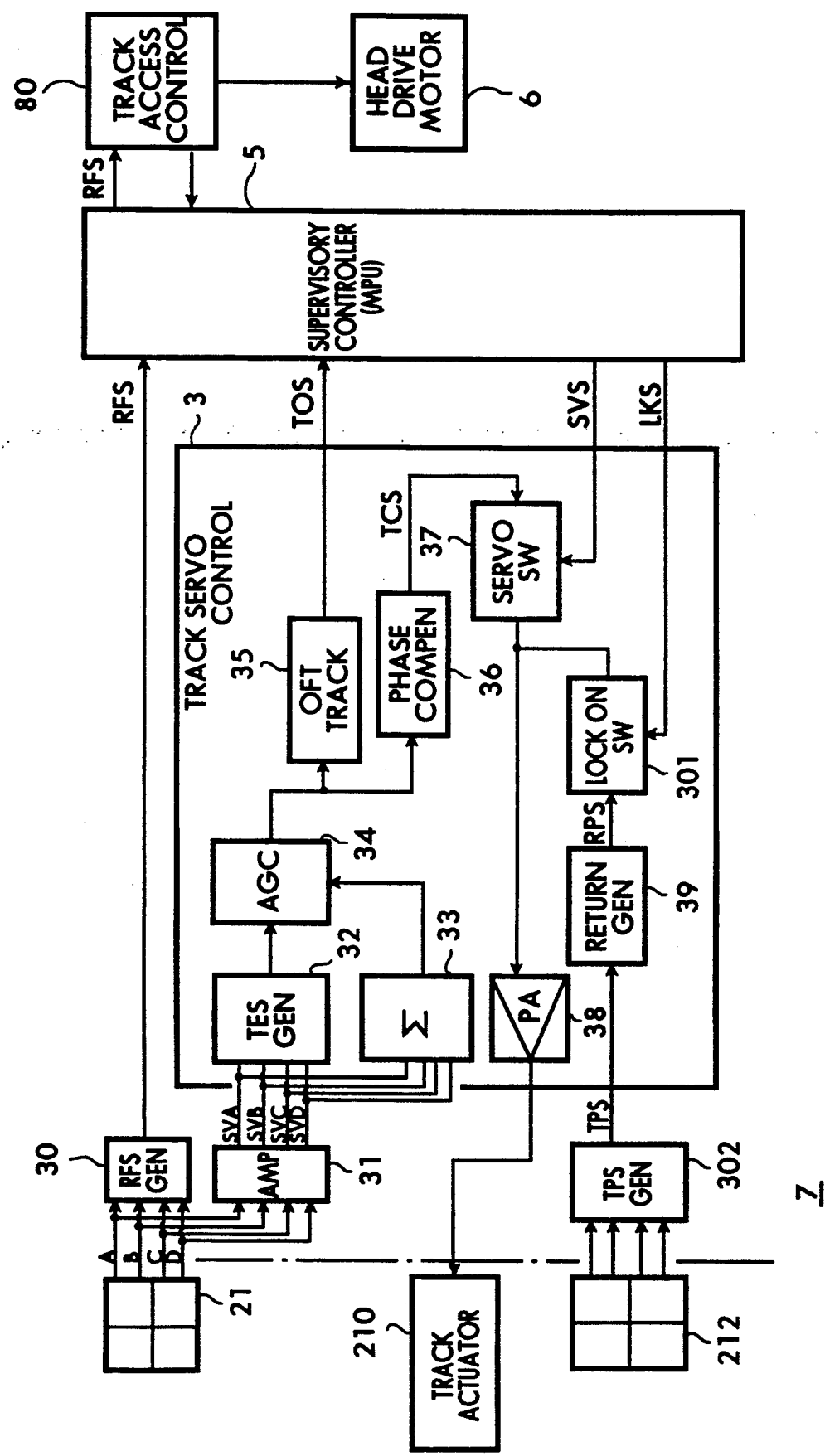
FIG. 8 is a block diagram of a track servo control and a track access control of an embodiment of the present invention.
Figure 9:
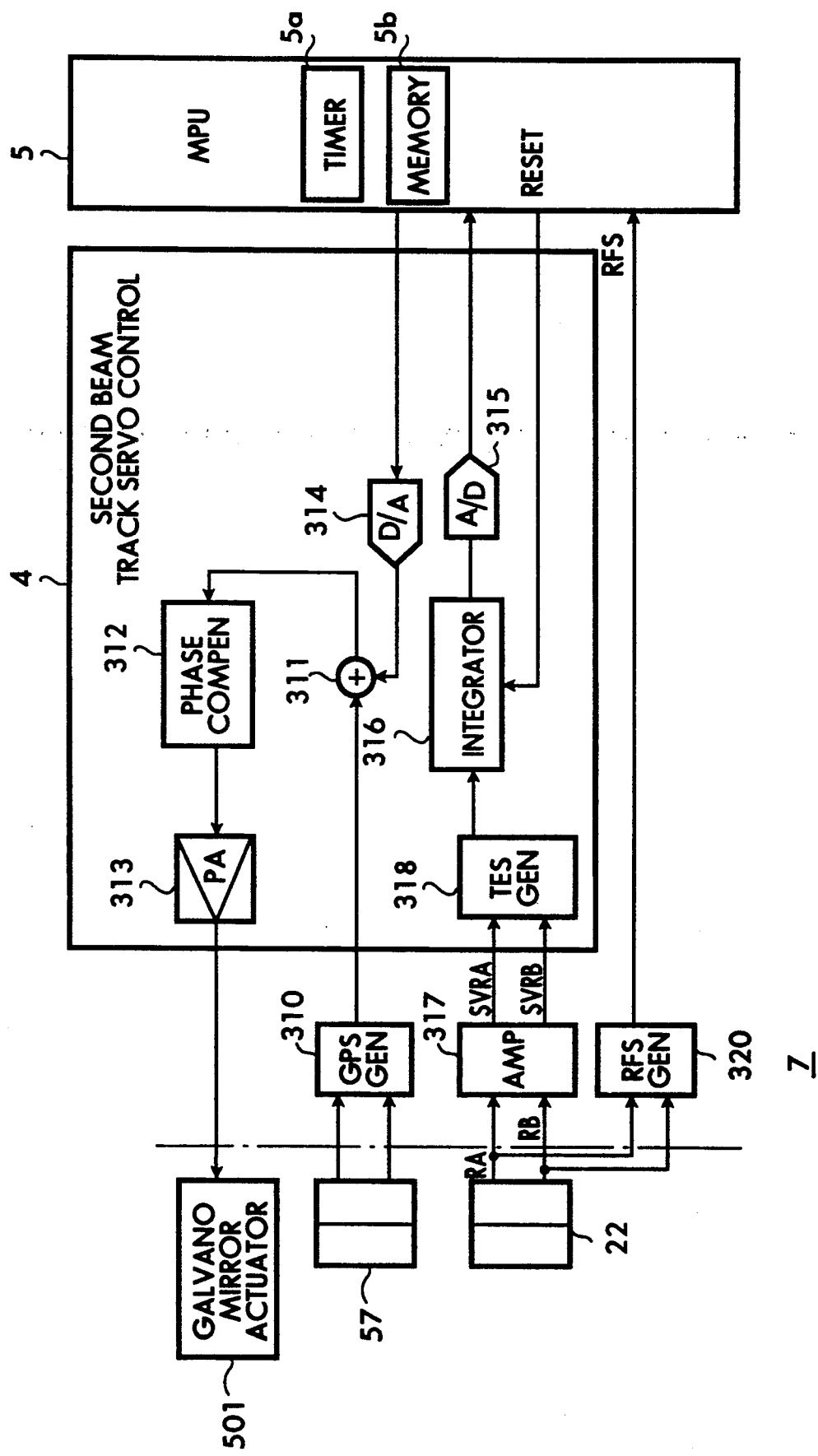
FIG. 9 is a block diagram of a track servo control and a track access control for a second beam of an embodiment of the present invention.

The track servo control 3 and a track access control 80 shown in FIG. 8 and a second beam track servo control 4 shown in FIG. 9 are connected to a supervisory controller 5 constituted from a microprocessor unit (MPU) and controlled thereby. The MPU 5 has a timer 5a and a memory 5b therein. The track access control 8 is provided to control the head drive motor 6.

The track servo control 3 is further connected to an optical head circuit section 7 which includes an RFS generating circuit 30 for producing an RF signal RFS from the four-division photodetector 21 for a write beam, an amplifier 31 for amplifying outputs A to D of the four-division photodetector 21 to develop servo outputs SVA to SVD, and a TPS generating circuit 302 for producing a track position signal TPS from the outputs A to D of the four-division photodetector 212a to 212d of the position sensor. The optical head circuit section 7 further includes, for the second beam track servo control 4, as shown in FIG. 9, a GPS generating circuit 310 for producing a PGS signal from outputs of the two-division photodetector 57 of the galvano mirror position sensor 222, an amplifier 317 for amplifying outputs RA and RB of the two-division photodetector 57 for a read signal to develop servo outputs SVRA and SVRB, and an RFS generating circuit 320 for producing an RF signal RFS from the output signals RA and RB of the two-division photodetectors 22.

The RFS generating circuit 30 produces an RF signal RFS from signals from the four-division photodetector 21, and such signal is used to read a track address preformatted on the optical disk. Meanwhile, another RF signal RFS produced from the outputs RA and RB of the two-division photodetectors 22 is used for reading of data.

In the following, construction of the track servo control 3 will be described. The track servo control 3 includes a track error signal generating circuit 32 for producing a track error signal TES from the servo outputs SVA to SVD of the amplifier 31. The track servo control 3 further includes a total signal generating circuit 33 for adding the servo outputs SVA to SVD from the amplifier 31 to produce a total signal DSC which represents a total reflection level. An AGC (automatic gain control) circuit 34 is provided for dividing the track error signal TES by the total signal DSC to execute automatic gain control with a total reflection level employed as a reference value to compensate for variations of a projected beam intensity and a reflection factor. A phase compensating circuit 36 is provided for differentiating the track error signal TES provided with a gain and adding the differentiated value and a proportional component of the track error signal TES to cause the phase of the track error signal TES to advance. An off track detecting circuit 35 is provided for detecting that the track error signal TES assumes a value either higher than a fixed value $V_0$ in the +direction or lower than a fixed value $-V_0$ in the −direction, that is, for detecting an off track condition to deliver an off track signal TOS to the MPU 5.

A servo switch 37 is closed to close a track servo loop in response to a servo on signal SVS received from the MPU 5 but opens the track servo loop when the servo on signal SVS is switched off. Meanwhile, a return signal generating circuit 39 for producing, from a signal from the TPS generating circuit 302, a return signal RPS for generating a returning force in the direction across tracks acting to return the object lens actuator body 204 toward the center position. A lock-on switch 301 is closed in response to switching on of a lock-on signal LKS received from the MPU 5 to introduce the return signal RPS to the track servo loop but is opened, when the lock-on signal LKS is switched off, to intercept the introduction of the return signal RPS to the track servo loop. A power amplifier 38 is provided for amplifying an output of the return signal generating circuit 39 to provide a track driving current TDV to the track actuator 210.

Subsequently, construction of the second beam track servo control 4 shown in FIG. 9 will be described. The second beam track servo control 4 includes a track error signal generating circuit 318 for producing a track error signal TES from the servo outputs SVRA and SVRB of an amplifier 317. Such track error signal TES is integrated by an integrator 316. An analog output of the integrator 316 is converted into a digital signal by an analog to digital converter 315 and transmitted to the MPU 5. The integrator 316 is reset in response to a reset signal from the MPU 5. The MPU 5 thus executes a predetermined calculation with a digital input thereto from the analog to digital converter 315 and transmits a result of such calculation to a digital to analog converter 314. The MPU 5 has therein a timer 5a and a memory 5b for storing therein a period of time for which the optical disk 1 makes one complete rotation.

The second beam track servo control 4 further includes a phase compensating circuit 312 for differentiating a GPS outputted from the galvano mirror position signal generating circuit 310 and adding the differentiated value to a proportional component of the GPS to cause the phase of the GPS to advance. A power amplifier 313 is provided for amplifying an output of the phase compensating circuit 312 and providing the amplified signal to the galvano mirror actuator 501 for the galvano mirror 29. An adder 311 is provided for adding a signal from the digital to analog converter 314 to an output GPS of the GPS generating circuit 310.

In the following, operation of the embodiment described above will be described. A write beam of light of a wavelength of 830 nm emitted from the semiconductor laser 24 is reflected by the optical disk 1 and then received by the four-division photodetector 21. The outputs A to D of the four-division photodetector 21 are amplified by the amplifier 31 to make servo outputs SVA to SVD. The servo outputs SVA to SVD are transmitted to the TES generating circuit 32 at which a track error signal TES is produced from the signals SVA to SVD. The total signal generating circuit 33 adds the servo outputs SVA to SVD to produce a total signal DSC representative of a total reflection level. The AGC circuit 34 divides the track error signal TES by the total signal DSC to execute automatic gain control with the total reflection level employed as a reference value to compensate for variations of an irradiated beam intensity and a reflection factor. The phase compensating circuit 36 differentiates the track error signal TES provided with a gain and adds the differentiated value to a proportional component of the track error signal TES. The servo switch 37 normally assumes an on-state, and an output signal TCS of the phase compensating circuit 36 is amplified by the power amplifier 38 and transmitted to the track actuator 210 by which the actuator body 204 on which the object lens 26 is carried is moved to control the track position of the write beam.

On the other hand, track servo control which is executed in response to a return signal RPS which is an output of the return signal generating circuit 39 is adopted when the optical head 2 is to be moved to a position near a target track by means of a drive motor not shown. The servo-on signal SVS of the MPU 5 is held in an off-state while the lock-on signal LKS is held in an on-state during movement of the optical head 2. Accordingly, the servo loop is not established in response to the track error signal TES, but the track actuator 210 is controlled to be locked in response to a track position signal TPS produced from the outputs A to D of the four-division photodetectors 212a to 212d. In particular, the track coil 210 is driven by the power amplifier 38 in response to a return signal RPS from the return signal generating circuit 39, and the actuator body 204 is controlled to be returned to and thereafter fixed at the center position.

The reason why the actuator body 204, that is, the object lens 26 is held in a locked condition in this manner is that it is intended to prevent the actuator body 204 from being moved within the optical head 2 by vibrations during movement of the optical head 2 thereby to prevent possible damages to the optical head. Thus, electric locking is carried out in response to the track position signal TPS.

Further, upon servo pulling in directly after switching on of the servo-on signal SVS after completion of the movement of the optical head 2, while the lock-on signal LKS is held in an on-state, track follow-up is controlled in accordance with the track error signal TES while providing a returning force toward the center position of FIG. 6B with the lock-on signal LKS. Consequently, pulling in to a track of the optical disk 1 which is in an eccentric condition is carried out at a position at which the amount of movement in a radial direction (in a direction transverse to the tracks) is minimum, and stabilized staring of pulling in can be realized.

After completion of servo pulling in, the lock-on signal LKS is switched off while the servo-on signal SVC is held in an on-state, thereby cancelling the control responsive to the return signal RPS. Meanwhile, when off track of a write beam is detected by the off track detecting circuit 35, a track off signal TOS is transmitted to the MPU 5. In response to the track off signal TOS, the MPU 5 switches the servo switch 37 off and switches the lock-on switch 310 on to execute control for causing the write beam to approach the target track.

While the track control for a write beam is described above, the operation of the track servo control 3 and the MPU 5 is similar to operation of those of a conventional apparatus and does not make essential part of the present invention. The track positions of a write beam and a read beam are moved simultaneously in accordance with such track servo control as described above.

In the following, track control of a read beam will be described with reference to FIG. 9.

A value GPS=A−B is obtained by the GPS generating circuit 310 from the outputs A and B of the two-division photodetectors 57a and 57b of the galvano mirror position sensor 222. The phase compensating circuit 312 differentiates the value GPS and adds the differentiated value to a proportional component of the signal GPS to cause the phase of the signal GPS to advance. An output of the phase compensating circuit 312 is amplified by the power amplifier 313 and transmitted to the galvano mirror actuator 501. The servo loop which is constituted from the two-division photodetector 57 of the galvano mirror position sensor 222, GPS generating circuit 310, phase compensating circuit 312, power amplifier 313 and galvano mirror actuator 501 electrically locks the galvano mirror 29 to maintain the position of the galvano mirror 29.

Meanwhile, outputs of the two-division photodetector 22 which receives a reflected signal of a read beam are amplified by the amplifier 317 to make servo outputs SVRA and SVRB, from which a track error signal TES is produced by the TES generating circuit 318. The track error signal TES is integrated by the integrator 316. Such integration is executed to enlarge an error to detect a fine displacement of tracks.

Figure 10:
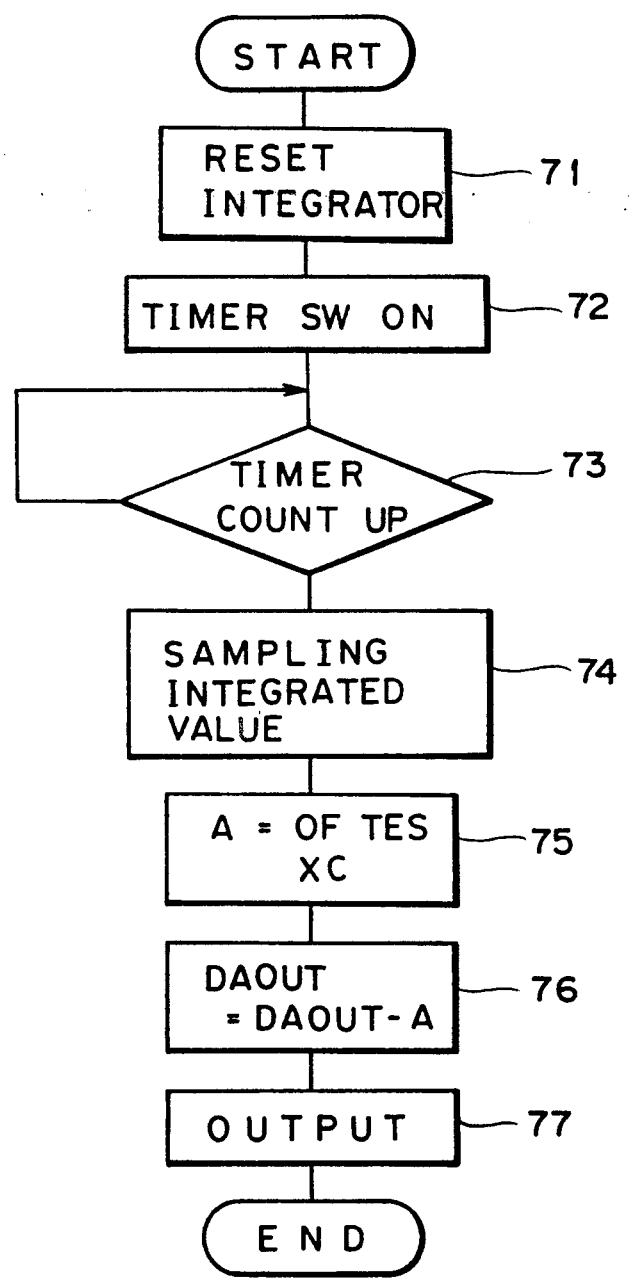
FIG. 10 is a flow chart illustrating operation of the second beam track servo control shown in FIG. 9.

In the following, an offset correction flow of a read beam will be described with reference to the flow chart of FIG. 10.

At first, the MPU 5 resets the integrator 316 with a reset signal (step 71). Then, the timer 5a of the MPU 5 is started (step 72). At step 73, the timer 5a is repetitively incremented by one until a precedently stored period of time necessary for the optical disk 1 to make one complete rotation elapses, and then, the process advances to step 74. At step 74, a result OFTES of the integration is sampled. The integration result OFTES is obtained by converting a value of the TES signal integrated by the integrator 316 into a digital signal by means of the analog to digital converter 315. Subsequently, the integration result OFTES is multiplied by a predetermined constant to obtain a result A (at step 75). At step 76, a value DAOUT which is a preceding output to the digital to analog converter 314 is subtracted by the value A to update the value DAOUT, and then at step 77, the value DAOUT is outputted to the digital to analog converter 314.

The value DAOUT outputted from the MPU 5 to the digital to analog converter 314 is converted into an analog signal by the digital to analog converter 314, and then it is added to an output of the GPS generating circuit 310 by the adder 311.

Figure 11:
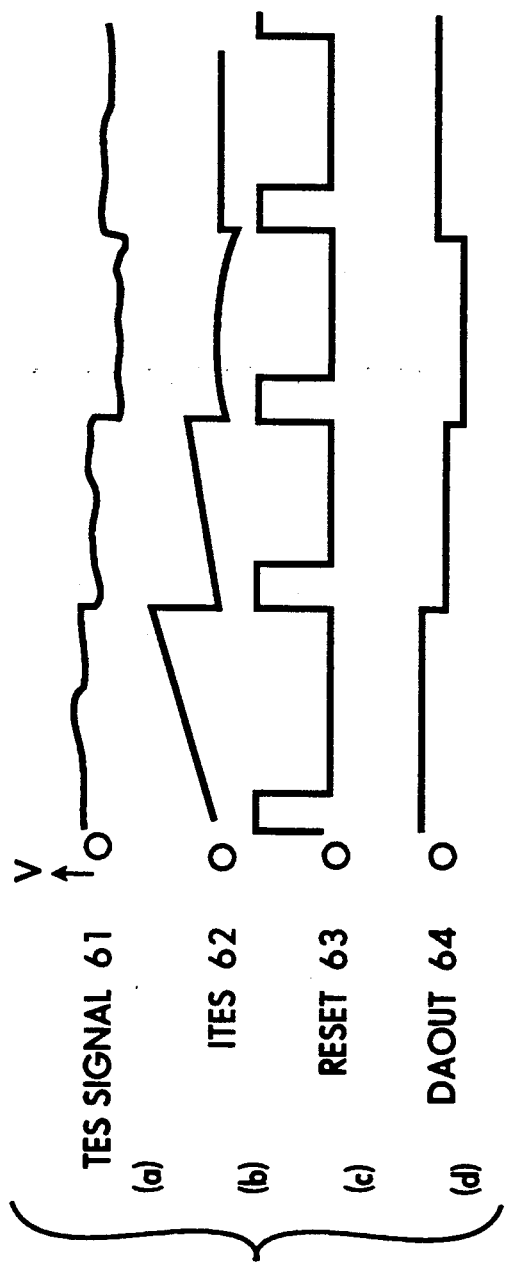
FIG. 11 is a wave form diagram of various signals when the second beam track servo control shown in FIG. 9 operates.

Referring to FIG. 11, there are shown wave forms of such various output signals as described above. A TES signal produced from the outputs of the two-division photodetector 22 by which reflected light of a read beam is received has such a wave form as shown by a curve 61 in FIG. 11. The TES signal 61 is integrated by the integrator 316 to make an ITES signal 62. The ITES signal 62 is cleared to zero each time the integrator 316 is reset by the MPU 5. A signal DAOUT 64 is outputted from the MPU 5 and represents a value of the preceding value DAOUT from which the integrated value is subtracted.

The signal DAOUT is converted into an analog signal by the digital to analog converter 314 and added to the signal GPS by the adder 311. Consequently, a signal to be outputted to the phase compensating circuit 312 is varied in response to a displacement of the read beam across tracks or in the direction transverse to the tracks. The phase compensating circuit 312 differentiates an output of the adder 311, and the differentiated value is added to a proportional component of the output of the adder 311 to cause the phase of the signal GPS to advance. Such addition by the adder 311 of the signal DAOUT produced in response to the TES signal by the MPU 5 is executed each time the optical disk makes one complete rotation.

Subsequently, an embodiment of the track access control which is a characteristic of the present invention will be described in detail.

When a target track is to be accessed, the supervisory controller (MPU) 5 instructs a track address control section 80 an address of the target track to be accessed. The track access control section 80 drives the head drive motor 6 to access the target address. During movement of the optical head 2, the MPU 5 switches the lock-on signal LKS off while keeping the servo-on signal SVS on. Consequently, while a servo loop is not formed in response to a track error signal TES, the track actuator 210 is controlled to be locked in response to a track position signal TPS based on the outputs A to D of the position sensors 212a to 212d. In particular, the track actuator 210 is driven by the power amplifier 38 in response to a return signal RPS of the return signal generating circuit 39 so that it is returned to and fixed at the center position.

In the following, track access of a read beam will be described with reference to FIGS. 3, 4A to 4C and 12. Referring first to FIGS. 3 and 4A to 4C, the distance between a read beam and a write beam is represented by y; the distance between the broken line 720 which is a locus of movement of the object lens and the center O of the optical disk 1 is represented by X; and the distances between the center of the circles and straight lines which pass the intersecting points 701, 702 and 703 and extend perpendicularly to the straight line 720 are represented by $D_1$, $D_2$ and $D_3$, respectively. Thus, in order to position a write beam and a read beam on the same track at any of the positions 701, 702 and 703, the read beam must be displaced by a distance equal; to $y\tan\theta_1=Xy/D_1$, $y\tan\theta_2=Xy/D_2$ or $y\tan\theta_3=Xy/D_3$ in the direction perpendicular to the tracks from the original positions where both the write beam and the read beam are positioned on straight lines perpendicular to the straight line 720.

An embodiment of track access control of a read beam will be described with reference to a flow chart shown in FIG. 12.

After starting of an accessing operation of a write beam, first in step 61, an offset amount of a read beam from the original point is detected from a current track address and stored into the memory. Here, the original point is a position of a read beam when it is positioned on the straight line perpendicular to the straight line on which the optical head moves. Subsequently, the track access control section 80 controls the head drive motor 6 to start accessing to a target track address instructed from a host control device not shown (step 62). At step 63, the MPU 5 calculates the distance D from the target track address. In particular, referring to FIG. 3, the distances $D_1$, $D_2$ and $D_3$ are calculated individually. Then, a track displacement from the original point of a read beam which is caused by the accessing is calculated. The track displacement can be obtained in accordance with an expression $y\tan\theta=Xy/D$. The value $Xy/D$ obtained is multiplied by a predetermined fixed value C to obtain $A=CXy/D$ (step 64).

Then, the value A obtained at step 64 is outputted to the digital to analog converter 314. When the output of the digital to analog converter 314 is equal to 0, the read beam is positioned at the original point. In particular, the spot position of a read beam projected on the optical disk 1 is positioned at the original point when a straight line which passes the positions of the write beam and the read beam extends perpendicularly to a locus of movement of the object lens. After the value A is outputted to the digital to analog converter 314 at step 64, the galvano mirror actuator 501 is supplied with an electric current which is necessary for the read beam to be positioned on the same track as the write beam. Consequently, the read beam is moved in a direction perpendicular to the tracks so that it is finally positioned on the same track as the write beam. In particular, the write beam and the read beam have such a relative positional relationship as shown in one of FIGS. 4A to 4C in accordance with the track position to be accessed. After waiting a predetermined interval of time which originates from a mechanical delay at step 66, servo control based on track error signals is started.

Figure 12:
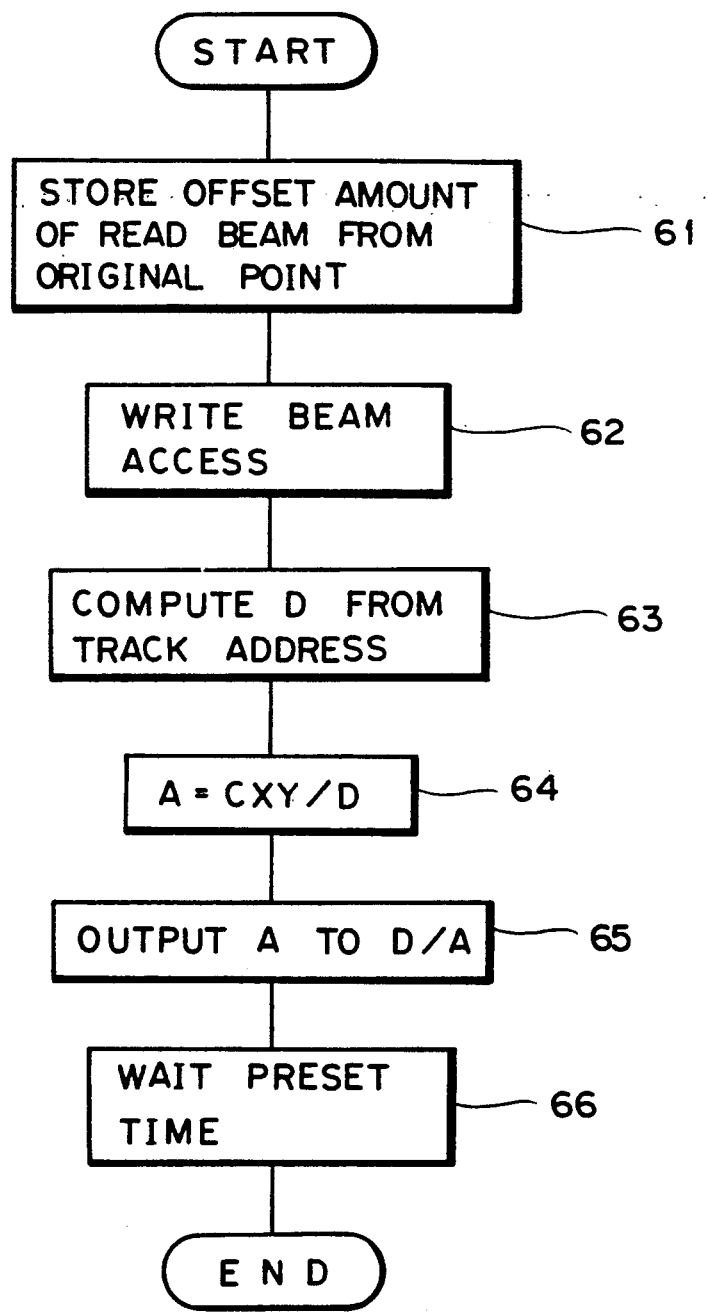
FIG. 12 is a flow chart illustrating operation of the track access control of the embodiment of the present invention.

The operation of the flow chart shown in FIG. 12 may be executed after accessing of a write beam to a target track is completed or otherwise during such accessing. Further, an accessing operation of a read beam may be started before a write beam starts accessing to a target track.

In the embodiment of the track access control of a read beam illustrated in the flow chart of FIG. 12, the track position of a read beam is controlled in accordance with a voltage to be applied to the galvano mirror actuator 501. In particular, the memory stores therein by what amount the track position of a read beam is moved according to the amount of change of the voltage to be applied to the galvano mirror actuator 501. In other words, the memory stores a constant C therein, and the driving amount of the galvano mirror actuator 501 is controlled in accordance with the constant C. Actually, however, since the constant C is varied by the sensitivity of a galvano mirror position sensor and a galvano mirror lock loop gain, such constant C must necessarily be adjusted for each of optical disk apparatus when those apparatus are forwarded from a factory. Further, since the sensitivity of a galvano mirror position sensor and the characteristics of a lens and so forth of an optical head are varied by a temperature variation, there is a problem that the value C is actually displaced from a value to which it was adjusted upon forwarding from a factory.

Figure 13:
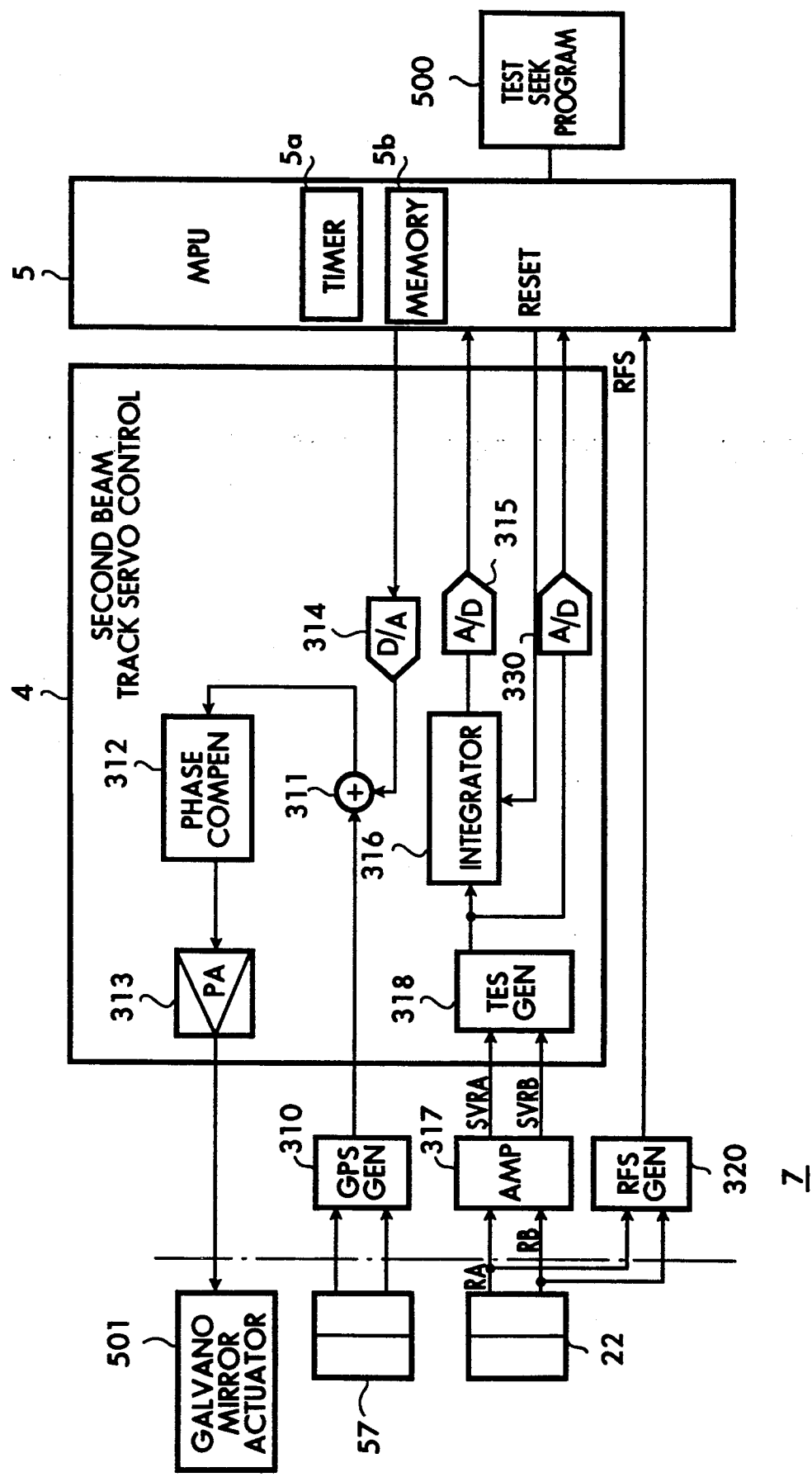
FIG. 13 is a block diagram of a track servo control and a track access control for a second beam of another embodiment of the present invention having a test seek program.

Another embodiment of the present invention with regard to read beam access control which overcomes the above-noted problem will be described in the following. The circuit construction of the present embodiment involves, as shown in FIG. 13, an addition of an analog to digital converter 330 to the circuit construction of FIG. 9, and the read beam access control is executed in accordance with a test seek program 500. In the present embodiment, test seeking of a read beam is executed upon starting of the apparatus or at a predetermined time interval (at a time interval of, for example, 15 to 20 minutes) by means of a timer, and a distance (a number of tracks) over which a read beam is actually moved is stored into the memory in accordance with an output voltage of the digital to analog converter 314, and then, a value of the number of tracks across which the read beam is to be moved is outputted to the digital to analog converter 314. The relationship of the output of the digital to analog converter 314 to the track position of a read beam and a track error signal TES is shown in FIG. 15A to 15C.

If the output DAOUT to the digital to analog converter 314 is increased in such a manner as shown in FIG. 15A, then a read beam will move across the tracks in such a manner as shown in FIG. 15B. A track error signal TES obtained by the two-division photodetector 22 then varies in such a manner as shown in FIG. 15C. When a read beam moves from the center 7a of a track to the center 7b of another adjacent track, the track error signal TES varies from a point 70a to another point 70b. In particular, the track error signal TES varies from 0 once to a positive value and then to a negative value whereafter it returns to 0 again. The output DAOUT to the digital to analog converter 314 moves from a point 71a to another point 71b as shown in FIG. 15A. In this instance, the difference between the points 71b and 71a is an output value which is necessary for a read beam to move over a one track distance. While the output value DAOUT to the digital to analog converter 314 which is necessary for a read beam to move over a one track distance is varied when the sensitivity of the galvano mirror position sensor 57 or the two-division photodetector 22 or the refraction index of the object lens or the like is varied due to a temperature variation or the like, the problem can be solved by executing the test seek program of the present embodiment shown by the flow chart of FIG. 14 when the power is made available or each time a predetermined fixed interval of time elapses at the timer 5a.

Figure 14:
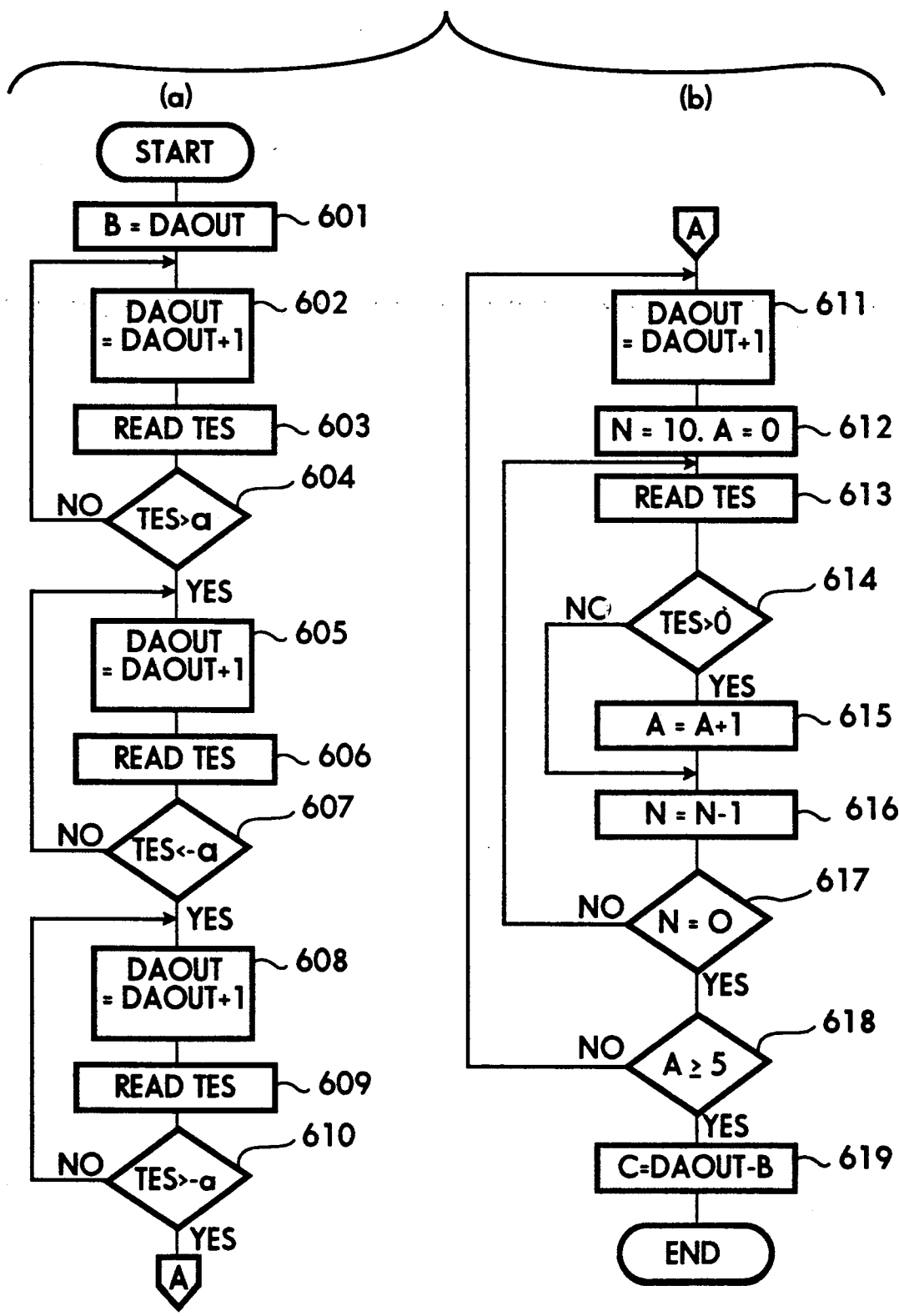
FIG. 14 is a flow chart of the test seek program.

FIG. 14 is a flow chart of the test seek program 500 which is started by the MPU 5. First at step 601, a current output value DAOUT from the MPU 5 to the digital to analog converter 314 is stored into the memory 5b of the MPU 5. At step 602, the value DAOUT is incremented by 1, and at step 603, the updated value DAOUT is outputted to the digital to analog converter 314 and a resulted track error signal TES is read. The value TES is converted into a digital value by the analog to digital converter 330 and inputted to the MPU 5. At step 604, it is judged whether or not the track error signal TES is greater than a preset value "a". In case the value TES is greater than "a", the step 605 is executed subsequently. To the contrary, if the value TES is equal to or smaller than "a", then the steps 602 and 603 are executed again.

The steps 602 to 604 define a process of incrementing the value DAOUT and detecting whether or not the track error signal TES reaches the point 75a shown in FIG. 16B.

The value DAOUT is incremented by 1 again at step 605, and at step 606, the updated value DAOUT is outputted to the digital to analog converter 314 and a track error signal TES is read. The signal TES is converted into a digital value by the analog to digital converter 330 and inputted to the MPU 5. Then, at step 607, it is judged whether or not the signal TES is smaller than a preset value "−a". In case the signal TES is smaller than "−a", the step 608 is executed subsequently, but if the signal TES is equal to or greater than "−a", then the steps 605 to 607 are executed again. The steps 605 to 607 define a process of incrementing the value DAOUT and detecting whether or not the track error signal TES reaches the point 75b shown in FIG. 16B.

At step 608, the value DAOUT is incremented by 1 again, and at step 609, the updated value DAOUT is outputted to the digital to analog converter 314 and a resulted track error signal TES is read. The signal TES is converted into a digital value by the analog to digital converter 330 and inputted to the MPU 5. Then, at step 610, it is judged whether or not the signal TES is greater than a predetermined value "−a". In case the signal TES is greater than "−a", then the step 611 is executed, but if the signal TES is equal to or smaller than "−a", then the steps 608 and 609 are executed again. The steps 608 to 610 define a process of incrementing the value DAOUT and detecting whether or not the track error signal TES reaches the point 75c shown in FIG. 16B.

At step 611, the value DAOUT is incremented by 1 over again, and at step 612, N=10 and A=0 are set. Then at step 613, a track error signal TES is read, and at step 614, it is judged whether or not the signal TES is greater than 0. In case the signal TES is greater than 0, then the step 615 is executed, but if the signal TES is equal to or smaller than 0, then the step 616 is executed. At step 615, the value A is incremented by 1, and at step 616, the value N is decremented by 1. Then at step 617, it is judged whether or not the value N is equal to 0. In case the value N is equal to 0, then the step 618 is executed, but if the value N is not equal to 0, then the steps 613 to 616 are executed again. At step 618, it is judged whether or not the value A is equal to or greater than 5, and if the value A is equal to or greater than 5, then the step 619 is executed, but if the value A is smaller than 5, then the steps 611 to 617 are executed again. Then at step 619, C=DAOUT−B is set. Thus, an output DAOUT can be obtained which is necessary for a read beam to move over a one track distance.

The process at steps 613 to 615 is executed 10 times based on the steps 616 and 617. As a result, if the value A is equal to 5, that is, if the case wherein the signal TES read presents a value greater than 0 occurs five or more times for 10 times, then C=DAOUT−B is set. The value C is equal to an output value DAOUT to the digital to analog converter 314 which is necessary for a read beam to move over a one track distance.

The value C obtained by the process of FIG. 14 is used at step 64 of the flow chart of FIG. 14. In particular, in the present embodiment, a value obtained by correcting a predetermined value in accordance with a sensitivity of the galvano mirror position sensor or the like is used as a value C. In other words, according to the control method of the present embodiment, the value C is not a fixed value but varies in accordance with a sensitivity of a galvano mirror position sensor or the like. As a result, even if environmental conditions change upon track accessing of a read beam, the read beam can be controlled to always access the same track as a write beam.

Figure 17:
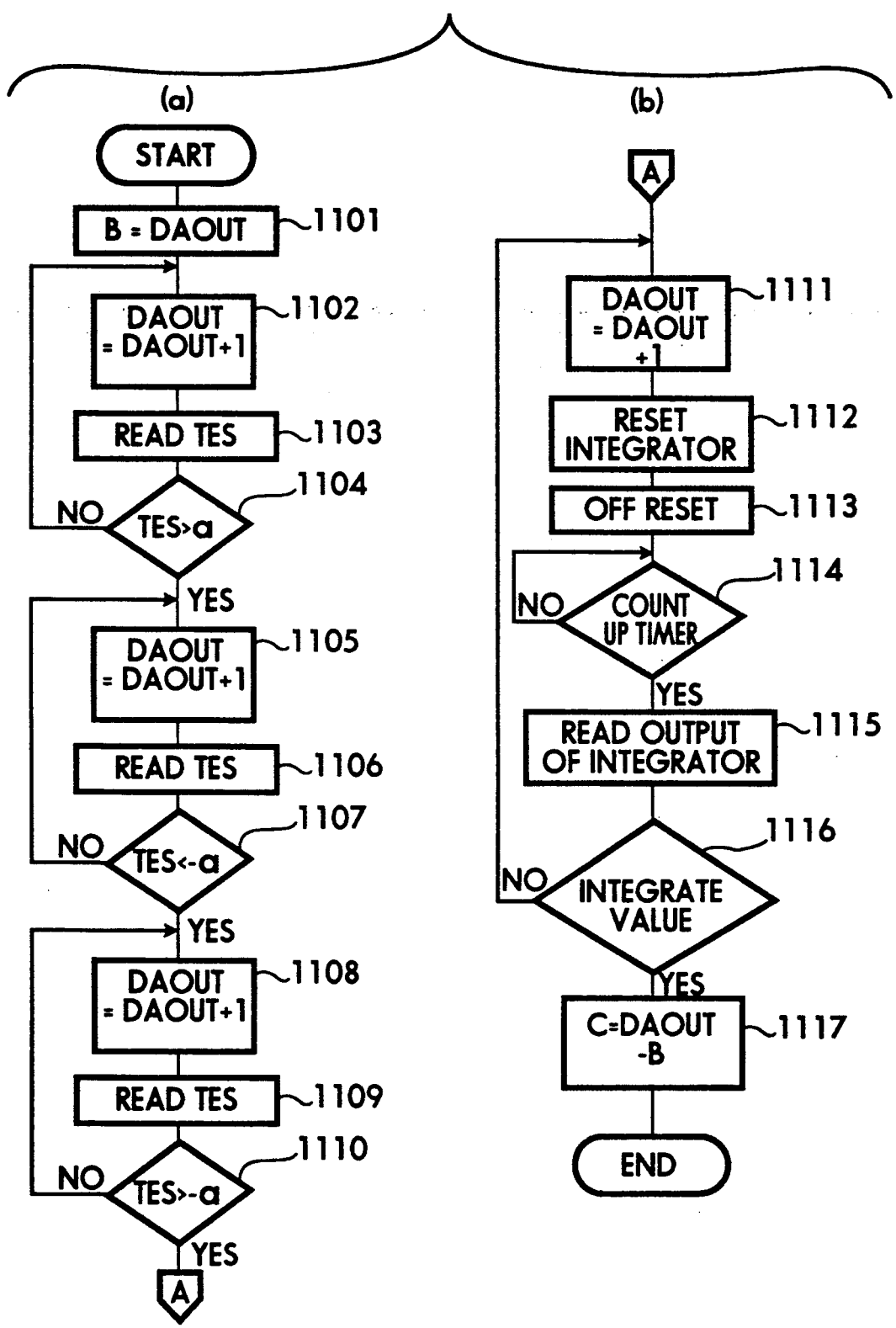
FIG. 17 is a flow chart of another embodiment of a test seek program.

Referring now to FIG. 17, another embodiment of the test seek program 500 will be described with reference to FIG. 17.

Steps 1101 to 1110 are similar to the steps 601 to 610, respectively, of the flow chart of FIG. 14. At step 1111, the value DAOUT is incremented by 1. Then at step 1112, a reset signal is outputted to the integrator 316, and then at step 1113, the reset signal is turned off. At step 1114, the timer is incremented repetitively until a predetermined period of time (1 ms to 2 ms) elapses. Then at step 1115, an output from the integrator 316 to the analog to digital converter 315 is read. At step 1116, it is judged whether or not the result of the integration is greater than 0, and in case the result is greater than 0, the step 1117 is executed subsequently, but if the result is equal to or smaller than 0, then the steps 1111 to 1115 are executed again. Then at step 1117, the value B stored at step 1101 is subtracted from a current value DAOUT to obtain a value C which is necessary for a read beam to move over a one track distance, and the value C is outputted to the digital to analog converter 314.

In the embodiment shown in the flow chart of FIG. 17, a movement of a read beam over a one track distance is judged not based on a track error signal TES which is read directly but based on an integrated value of track error signals TES for a predetermined period of time.

While the present invention has been described so far in connection with the preferred embodiments shown in the drawings, the present invention is not limited to those particulars. For example, a write beam may otherwise be controlled relative to a read beam using the read beam for track control of an optical head.

What is claimed is:

1. A track access control apparatus for an optical disk apparatus including a rotatable optical disk having a center on which a plurality of guide grooves for defining tracks and guiding a beam spot projected thereon are spirally formed along a direction of rotation of the rotatable optical disk, and an optical head including a first light source for emitting a first beam of first light, a second light source for emitting a second beam of second light and an object lens for focusing the first and the second beams onto the rotatable optical disk, said track access control apparatus comprising:

first photodetector means for detecting a third light of the first beam reflected from said rotatable optical disk and producing a first output signal;

optical head access control means for moving said optical head to a target position where the first beam is positioned on one of the tracks having a target track address, said optical head access control means including means for obtaining a current track address from the first output signal, means for detecting a difference between the target track address and the current track address and means for moving said object lens to the target position across the tracks of said rotatable optical disk along a first line which is offset from a second line passing through the center of said rotatable optical disk and parallel to the second line;

first and second sensors detecting first and second positional information of said first and second beams, respectively;

means for obtaining relative positional information between the first and the second beams on said rotatable optical disk at said target track address responsive to the first and second positional information and a geometrical positional relationship formed between the first and second beams;

means for computing a driving amount required to move the second beam to a target track based on said relative positional information; and means for moving a position of the second beam responsive to the driving amount on said rotatable optical disk.

2. A track access control apparatus according to claim 1, further comprising means for detecting environmental conditions and obtaining another driving amount of said second beam moving means required to move the second beam for a predetermined distance on said optical disk responsive to the environmental conditions experienced by said track access control apparatus; and means for modifying said driving amount of said second beam moving means responsive to said another driving amount.

3. A track access control apparatus according to claim 2, further comprising second photodetector means for detecting light of the second beam reflected from said optical disk and producing a second output signal, and wherein said another driving amount obtaining means comprises said means for moving the position of the second beam on said optical disk, means for locating the position of the second beam on said optical disk based on said second output signal, and means for obtaining a moving distance of the second beam on said optical disk.

4. A track access control apparatus according to claim 1, wherein said second beam moving means comprises a mirror pivotally mounted about an axis for inclining the optical axis of the second beam passing through said object lens, third photodetector means for detecting a current position of said mirror and producing a third output signal, and actuator means for pivotally moving said mirror about said axis based on said third output signal and said driving amount.

5. A track access control apparatus according to claim 1, wherein said first beam is a write beam and said second beam is a read beam.

6. A track access control method for an optical disk apparatus including a rotatable optical disk having a center on which a plurality of guide grooves for defining tracks and guiding a beam spot projected thereon are spirally formed along a direction of rotation of the rotatable optical disk, and an object lens for focusing light beams onto the rotatable optical disk, comprising the steps of:

projecting first and second beams onto said rotatable optical disk simultaneously through said object lens;

obtaining a first signal by detecting first light of the first beam reflected from said rotatable optical disk;

obtaining a current track address of the first beam on said rotatable optical disk from said first signal;

detecting a difference between the current track address and a target track address to which the first beam is to be moved;

moving said object lens across the tracks of said rotatable optical disk along a first line which is offset from a second line passing through the center of said rotatable optical disk so that the first beam is positioned on a target track;

detecting first and second positional information of said first and second beams;

obtaining relative positional information between the first and the second beams on said rotatable optical disk at said target track address responsive to the first and second positional information and a geometric positional relationship formed between the first and second beams;

computing a driving amount for moving the second beam to said target track based on said relative positional information; and moving a position of the second beam on said rotatable optical disk responsive to said driving amount to thereby position the second beam on said target track.

7. A track access control method according to claim 6, further comprising the steps of:

obtaining a second signal by detecting light of the second beam reflected from said optical disk;

moving the position of the second beam on said optical disk;

locating the position of the second beam on said optical disk based on said second signal;

obtaining a moving distance of the second beam on said optical disk;

computing another driving amount for moving the second beam for a predetermined distance on said optical disk; and modifying said driving amount of the second beam based on said another driving amount.

* * * * *